US012184319B2

(12) United States Patent
Steigert et al.

(10) Patent No.: US 12,184,319 B2
(45) Date of Patent: Dec. 31, 2024

(54) INDIRECT REFLECTION DETECTION FOR RECEIVER CIRCUITRY PROTECTION IN TDD TRANSCEIVERS

(71) Applicant: Outdoor Wireless Networks LLC, Hickory, NC (US)

(72) Inventors: Johannes Steigert, Harburg (DE); Rainer Friedrich, Maihingen (DE)

(73) Assignee: Outdoor Wireless Networks LLC, Claremont, NC (US)

( * ) Notice: Subject to any disclaimer, the term of this patent is extended or adjusted under 35 U.S.C. 154(b) by 362 days.

(21) Appl. No.: 17/574,369

(22) Filed: Jan. 12, 2022

(65) Prior Publication Data
US 2022/0224366 A1   Jul. 14, 2022

Related U.S. Application Data

(60) Provisional application No. 63/137,255, filed on Jan. 14, 2021.

(51) Int. Cl.
*H04B 1/18* (2006.01)
*H01Q 1/24* (2006.01)
*H04B 1/44* (2006.01)
*H04B 1/54* (2006.01)
*H04B 17/10* (2015.01)

(52) U.S. Cl.
CPC .............. *H04B 1/18* (2013.01); *H01Q 1/246* (2013.01); *H04B 1/44* (2013.01); *H04B 1/54* (2013.01); *H04B 17/101* (2015.01)

(58) Field of Classification Search
None
See application file for complete search history.

(56) References Cited

U.S. PATENT DOCUMENTS

| 2016/0105272 A1* | 4/2016 | Griffiths .................... H04L 5/14 370/278 |
| 2020/0344035 A1* | 10/2020 | Fackler .................. H04L 5/143 |
| 2021/0099208 A1* | 4/2021 | Krieger ................. H04W 88/12 |

FOREIGN PATENT DOCUMENTS

| WO | 2016101096 A1 | 6/2016 |
| WO | 2019034583 A1 | 2/2019 |

* cited by examiner

*Primary Examiner* — Frantz Bataille
(74) *Attorney, Agent, or Firm* — Fogg & Powers LLC

(57) ABSTRACT

In an example, a receiver protection circuit includes a directional coupler configured to be coupled to a receive signal path of a communications device between an isolation device and an amplifier of the receive signal path. The receiver protection circuit further includes a power detector coupled to the directional coupler and configured to measure a power level of a transmit leakage signal in the receive signal path. The receiver protection circuit further includes a comparator configured to compare the measured power level of the transmit leakage signal in the receive signal path to a threshold value and output an alarm signal indicating that the measured power level of the transmit leakage signal exceeds the threshold value.

20 Claims, 6 Drawing Sheets

INDIRECT REFLECTION DETECTION FOR RECEIVER CIRCUITRY PROTECTION IN TDD TRANSCEIVERS

CROSS-REFERENCE TO RELATED APPLICATIONS

This application claims the benefit of U.S. Provisional Application Ser. No. 63/137,255, filed Jan. 14, 2021, and titled "INDIRECT REFLECTION DETECTION FOR RECEIVER CIRCUITRY PROTECTION IN TDD TRANSCEIVERS," which is hereby incorporated herein by reference.

BACKGROUND

Reflection measurements are commonly used at the output of systems in order to determine return loss and monitor whether the system is sufficiently well matched to a following stage (for example, an antenna or cable coupled to an antenna). During normal operation, the cable and the antenna coupled to a system only cause minor reflections. However, when the cable is broken or the antenna is shorted, the reflection coefficient at the output of the system increases significantly and a large amount of transmit radio frequency (RF) power is reflected. The reflected transmit RF power can damage components of the receiver circuitry (for example, low-noise amplifier (LNA), RF switches, terminations, etc.) in time-division duplexing (TDD) systems, frequency-division duplexing (FDD), and in-band full-duplex (FD) systems.

SUMMARY

In an example, a communications device is provided. The communications device includes a transmit signal path and a receive signal path. The communications device further includes an isolation device coupled to the transmit signal path and the receive signal path. The isolation device is configured to provide an analog transmit signal from the transmit signal path to an antenna port of the isolation device and to provide an analog receive signal from the antenna port to the receive signal path. The communications device further includes a coupler coupled to the receive signal path between the isolation device and an amplifier of the receive signal path. The communications device further includes a power detector coupled to the coupler and configured to measure a power level of a transmit leakage signal in the receive signal path. The communications device further includes a comparator configured to compare the measured power level of the transmit leakage signal to a first threshold value and output a first alarm signal indicating that the measured power level of the transmit leakage signal exceeds the first threshold value. The communications device is configured to reduce a transmit output power in response to the first alarm signal.

In another example, a method of protecting receiver circuitry is provided. The method includes measuring a power level of a transmit leakage signal in a receive signal path. The method further includes comparing the measured power level of the transmit leakage signal to a threshold voltage. The method further includes outputting an alarm signal indicating that the measured power level of the transmit leakage signal exceeds the threshold voltage. The method further includes reducing a transmit output power in response to the alarm signal.

In an example, a receiver protection circuit is provided. The receiver protection circuit includes a directional coupler configured to be coupled to a receive signal path of a communications device between an isolation device and an amplifier of the receive signal path. The receiver protection circuit further includes a power detector coupled to the directional coupler and configured to measure a power level of a transmit leakage signal in the receive signal path. The receiver protection circuit further includes a comparator configured to compare the measured power level of the transmit leakage signal in the receive signal path to a threshold value and output an alarm signal indicating that the measured power level of the transmit leakage signal exceeds the threshold value.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. The following detailed description is, therefore, not to be taken in a limiting sense.

Return loss generally describes how well an impedance is matched to the characteristic impedance and is defined by the logarithmic ratio between the reflected wave and the transmitted wave at the point of measurement. Common return loss measurement systems include a directional coupler at or near the antenna, power detectors, and a processing unit. The directional coupler couples and separates the transmitted wave and the reflected wave, and the power detectors measure the power levels of the coupled portions of the transmitted wave and the reflected wave. The power detectors output voltages proportional to the power levels, which are converted to digital signals and used by the processing unit to calculate the return loss.

There are several disadvantages of the common return loss measurement systems. First, the common return loss measurement systems are not able to accurately measure low return losses where there is a significant amount of reflected transmit RF power, which can lead to false alarms or damaged receiver circuitry. Further, the insertion loss of the directional coupler used in the common return loss measurement systems can degrade the maximum output power of the RF system. Also, the processing unit used in common return loss measurement systems is relatively expensive and requires a sometimes unacceptably large amount of time to detect reflection, assert an alarm, and take further action to protect the receiver circuitry from damage. There is a need for a mechanism that addresses the problems with common return loss measurement systems.

Figure 1:
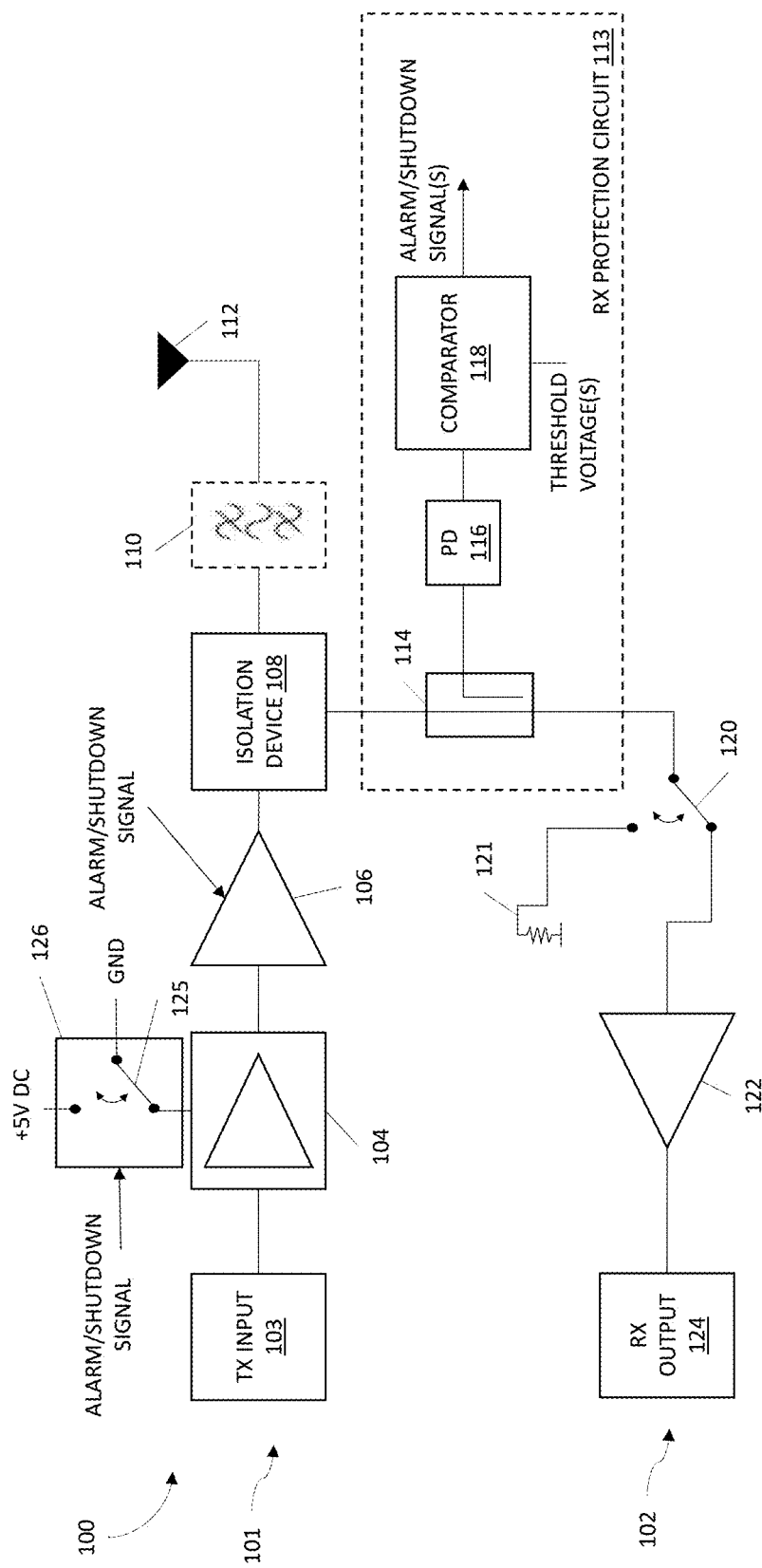
FIG. 1 is a block diagram of an example TDD transceiver that includes a receiver protection circuit.

FIG. 1 illustrates a block diagram of an example TDD transceiver 100 that includes a receiver protection circuit 113. The TDD transceiver 100 includes a transmit signal path 101, a receive signal path 102, and a receiver protection circuit 113 coupled to the receive signal path 102. It should be understood that the particular components and configuration of the components of the TDD transceiver 100 can vary depending on requirements.

In the example shown in FIG. 1, the transmit signal path 101 includes a transmit input 103, a driver stage 104, and a power amplifier 106. In the example shown in FIG. 1, the transmit signal path 101 of the TDD transceiver 100 is configured to receive an analog transmit signal via the transmit input 103 and amplify the analog transmit signal using the driver stage 104 and the power amplifier 106 in the transmit signal path 101. In some examples, the transmit signal path 101 can include one or more pre-amplifiers, one or more additional driver stages, and/or one or more additional power amplifiers. In the example shown in FIG. 1, the transmit signal path 101 is coupled to an isolation device 108, which is configured to direct the amplified, analog transmit signal to the antenna 112 for radiation to one or more mobile devices in the coverage area of the TDD transceiver 100.

In the example shown in FIG. 1, the receive signal path 102 is also coupled to the isolation device 108, which is configured to provide an analog receive signal from the antenna 112 to the receive signal path 102. In the example shown in FIG. 1, the receive signal path 102 includes a switch 120 coupled to a termination 121, a low-noise amplifier 122, and a receive output 124. For a transmit mode of TDD operation, the TDD transceiver 100 is configured to couple the switch 120 to the termination 121 in order to provide additional isolation between the transmit signal path 101 and the receive signal path 102. For a receive mode of TDD operation, the TDD transceiver 100 is configured to couple the switch 120 to the low-noise amplifier 122 to enable reception and processing of the analog receive signals in the receive signal path 102. The receive signal path 102 is configured to amplify the analog receive signal using the low-noise amplifier 122 and output the amplified, analog receive signal via the receive output 124 for further processing.

In some examples, the isolation device 108 is a circulator where the transmit signal path 101 is coupled to a first port of the circulator, the antenna 112 is coupled to a second port of the circulator, and the receive signal path 102 is coupled to a third port of the circulator. In some such examples, the TDD transceiver 100 also includes a bandpass filter 110 between the circulator and the antenna 112. In some examples, the isolation device 108 is a device other than a circulator (for example, a hybrid coupler). In some examples, the isolation device 108 can also be coupled to multiple separate antennas rather than a single antenna 112 as shown in FIG. 1. It should be understood that different configurations of the isolation device 108 and antennas 112 can also be used.

During operation, the majority of the amplified, analog transmit signal should be transmitted via the antenna 112. However, a small portion of the amplified, analog transmit signal can leak into the receive signal path 102 due to finite transmitter-to-receiver isolation of the isolation device 108. In order to protect the circuitry in the receive signal path 102 from damage caused by the finite isolation and reflected RF power, the TDD transceiver 100 further includes a receiver protection circuit 113 coupled to the receive signal path 102. In the example shown in FIG. 1, the receiver protection circuit 113 is coupled between the isolation device 108 and the switch 120 in the receive signal path 102.

In the example shown in FIG. 1, the receiver protection circuit 113 includes a directional coupler 114, a power detector 116, and a comparator 118. The directional coupler 114 is coupled to the receive signal path 102 between the isolation device 108 and the components to be protected (for example, the switch 120, the termination 121, and the low-noise amplifier 122). The directional coupler 114 is configured to couple a portion of a transmit leakage signal from the receive signal path 102 to the power detector 116.

The power detector 116 is configured to measure a power level of the transmit leakage signal coupled from the receive signal path 102. In some examples, the power detector 116 is a peak power detector. In other examples, the power detector 116 is an average power detector or a different type of power detector. The power detector 116 is configured to provide a voltage that is proportional to the measured power level of the transmit leakage signal to the comparator 118. While the power detector 116 and the comparator 118 are shown as discrete components in FIG. 1, it should be understood that the power detector 116 and comparator 118 can be combined in a single component in other examples.

Figure 2:
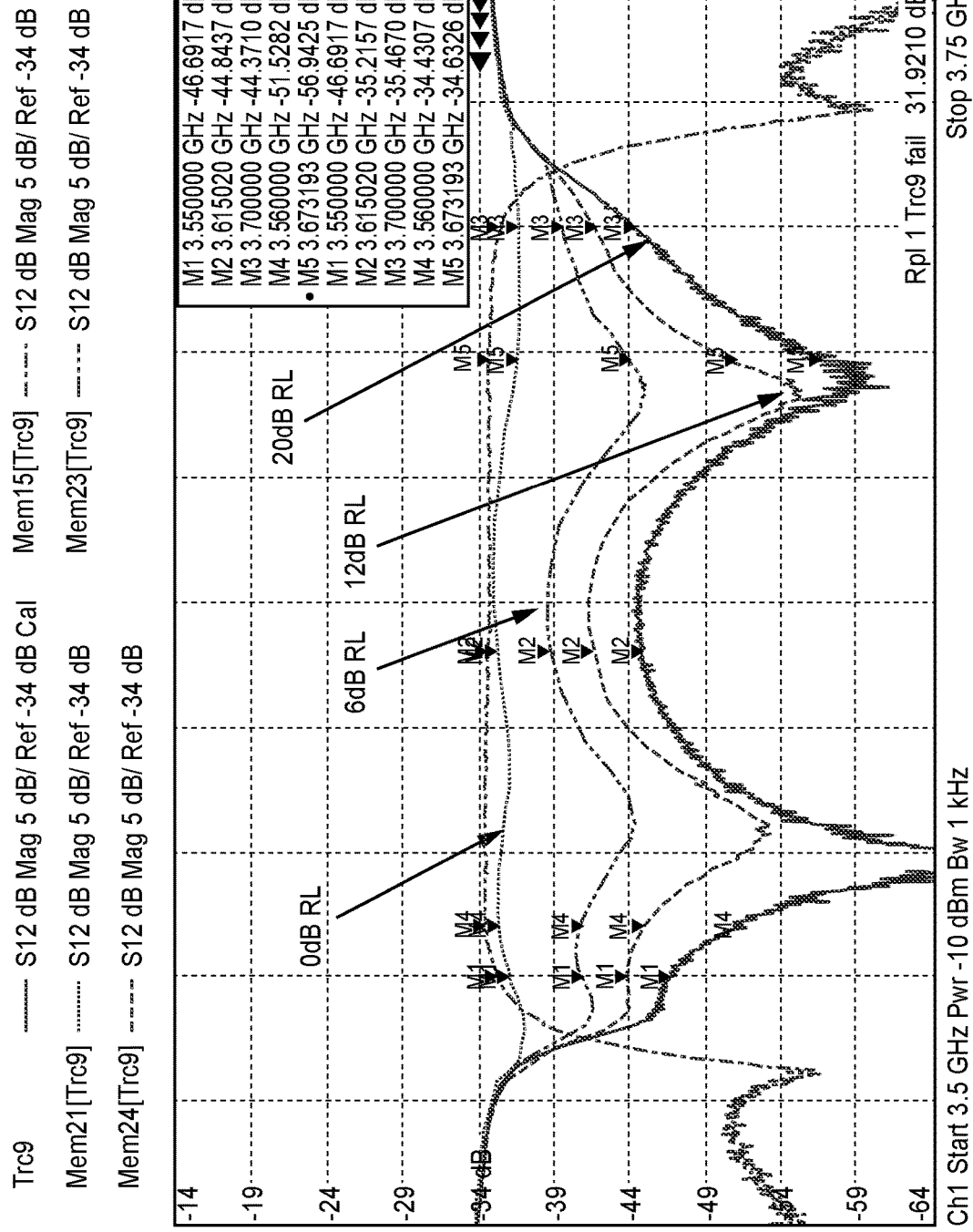
FIG. 2 is graph of isolation between a transmit signal path and receive signal path in a time-division-duplexing (TDD) transceiver including the receiver protection circuit of FIG. 1.

The comparator 118 is configured to compare the signal from the power detector 116 to a threshold value (for example, a threshold voltage) and output an alarm signal indicating that the measured power level of the transmit leakage signal exceeds the threshold value. In some examples, the threshold value is determined or selected based on a known relationship between return loss and the isolation between the transmit signal path 101 and the receive signal path 102 for the TDD transceiver 100. FIG. 2 illustrates an example graph showing the isolation between the transmit signal path and the receive signal path at room temperature. It can be seen that the insertion loss (y-axis) for the transmit leakage signal is dependent on the return loss at the antenna port of the isolation device 108, so the isolation provided between the transmit signal path 101 and the receive signal path 102 is dependent on the return loss at the antenna port of the isolation device 108. In the example shown in FIG. 2, the isolation between the transmit signal path 101 and the receive signal path 102 is lowest when the return loss is 0 dB and highest when the return loss is 20 dB, so the isolation between the transmit signal path 101 and the receive signal path 102 increases as the return loss increases. The behavior of the TDD transceiver 100 can be observed in order to determine power levels of transmit leakage signal that are correlated with particular return losses at the antenna port of the isolation device 108. The threshold value can be set such that an alarm signal is only output by the comparator 118 when a particular return loss is inferred in order to avoid false alarms and degraded performance.

In some examples, the comparator 118 is configured to compare the signal from the power detector 116 to multiple threshold values (for example, threshold voltages) and output different alarm signals indicating that the measured power level of the transmit leakage signal exceeds a particular threshold value. In some examples, each of the multiple threshold values are determined or selected based on a known relationship between return loss and the isolation between the transmit signal path 101 and the receive signal path 102 for the TDD transceiver 100. The different threshold values are determined or selected to correspond to different risk levels for the circuitry in the receive signal path 102. For example, a first threshold value can correspond to a power level that is harmful to the circuitry of the receive signal path 102 and a second threshold value can correspond to a power level that is critical, but would not damage the circuitry of the receive signal path 102. More than two threshold values can used by the comparator 118 depending on the desired level of protection.

The TDD transceiver 100 is configured to reduce the output signal power level in response to the comparator 118 outputting the alarm signal(s). The particular actions taken to reduce the output signal power level and protect the components of the receive signal path 102 for the TDD transceiver 100 can be different depending on the particular threshold value that the measured power level of the transmit leakage signal exceeds.

In some examples, the TDD transceiver 100 is configured to reduce the output signal power level by shutting down the driver stage 104 in response to the comparator 118 outputting an alarm signal (for example, indicating that the measured power level exceeds the first threshold value discussed above). In some examples, the comparator 118 is an analog component that is coupled to a switch 125 in a power supply 126 of the driver stage 104. In such examples, the alarm signal output by the comparator 118 is used to control the switch 125 to shut down the power supply 126 of the driver stage 104. In other examples, the comparator 118 is coupled to a controller of the TDD transceiver 100 or a controller of a device that includes the TDD transceiver 100, and the controller is configured to shut down the driver stage 104 (for example, by controlling the switch 125 of power supply 126).

In some examples, the TDD transceiver 100 is configured to reduce the output signal power level by reducing the supply voltage of the driver stage 104 in response to the comparator 118 outputting an alarm signal (for example, indicating that the measured power level exceeds the second threshold value discussed above). For example, the TDD transceiver 100 can reduce the supply voltage of the driver stage 104 from 5 V to 3.3 V. It should be understood that a different supply voltage (other than 5 V) and/or a different reduction (other than 1.7 V) could be used to reduce the output signal power level. In some examples, the alarm signal output by the comparator 118 can be used to control the supply voltage provided by the power supply 126 of the driver stage 104. In other examples, the comparator 118 is coupled to a controller of the TDD transceiver 100 or a controller of a device that includes the TDD transceiver 100, and the controller is configured to reduce the supply voltage of the driver stage 104 (for example, by controlling the power supply 126). Reducing the supply voltage of the driver stage 104 could be performed in addition to (for example, prior to shutting down the driver stage 104) or instead of shutting down the driver stage 104.

In some examples, the TDD transceiver 100 is configured to reduce the output signal power level by shutting down the power amplifier 106 in response to the comparator 118 outputting an alarm signal (for example, indicating that the measured power level exceeds the first threshold value discussed above or a different threshold value). In some examples, the biasing of the power amplifier 106 can be switched off in response to the alarm signal. In some examples, the comparator 118 is an analog component that is coupled to a switch in a power supply (not shown) of the power amplifier 106. In such examples, the alarm signal output by the comparator 118 is used to control the switch to shut down the power supply of the power amplifier 106. In other examples, the comparator 118 is coupled to a controller of the TDD transceiver 100 or a controller of a device that includes the TDD transceiver 100, and the controller is configured to shut down the power amplifier 106 (for example, by controlling the switch of power supply of the power amplifier). Shutting down the power amplifier 106 could be performed in addition to or instead of modifying operation of the driver stage 104.

In some examples, the TDD transceiver 100 is configured to reduce the output signal power level by reducing the supply voltage of the power amplifier 106 in response to the comparator 118 outputting an alarm signal (for example, indicating that the measured power level exceeds the second threshold value discussed above or a different threshold value). For example, the TDD transceiver 100 can reduce the supply voltage of the power amplifier 106 from 32 V to 23 V. It should be understood that a different supply voltage (other than 32 V) and/or a different reduction (other than 9 V) could be used to reduce the output signal power level. In some examples, the alarm signal output by the comparator 118 can be used to control the supply voltage provided by the power supply (not shown) of the power amplifier 106. In other examples, the comparator 118 is coupled to a controller of the TDD transceiver 100 or a controller of a device that includes the TDD transceiver 100, and the controller is configured to reduce the supply voltage of the power amplifier 106 (for example, by controlling the power supply of the power amplifier). Reducing the supply voltage of the power amplifier 106 could be performed in addition to shutting down the power amplifier 106 (for example, prior to shutting down the power amplifier) or instead of shutting down the power amplifier 106. Reducing the supply voltage of the power amplifier 106 could also be performed in addition to or instead of modifying operation of the driver stage 104.

By reducing the supply voltage to and/or shutting down the driver stage 104 and/or power amplifier 106, the output power of the amplified, analog transmit signal is reduced to a non-harmful level and the components (for example, the switch 120, termination 121, and low-noise amplifier 122) in the receive signal path 102 are protected from being damaged.

One or more additional (or alternative) components in the TDD transceiver 100 can also be used to reduce the output power of the amplified, analog transmit signal. In some examples, an attenuator is included in the transmit signal path 101 and the attenuator is configured to increase attenuation of a signal traversing the transmit signal path 101 in response to the alarm signal. In some examples, the switch 120 in the receive signal path 102 can be coupled to the termination 121 in response to the alarm signal in order to protect the low-noise amplifier 122. The variety of shutdown options enables the TDD transceiver 100 to use a cascaded switching pattern that allows the output power of the amplified, analog transmit signal to be reduced to a required level to protect the receiver circuitry.

Figure 3B:
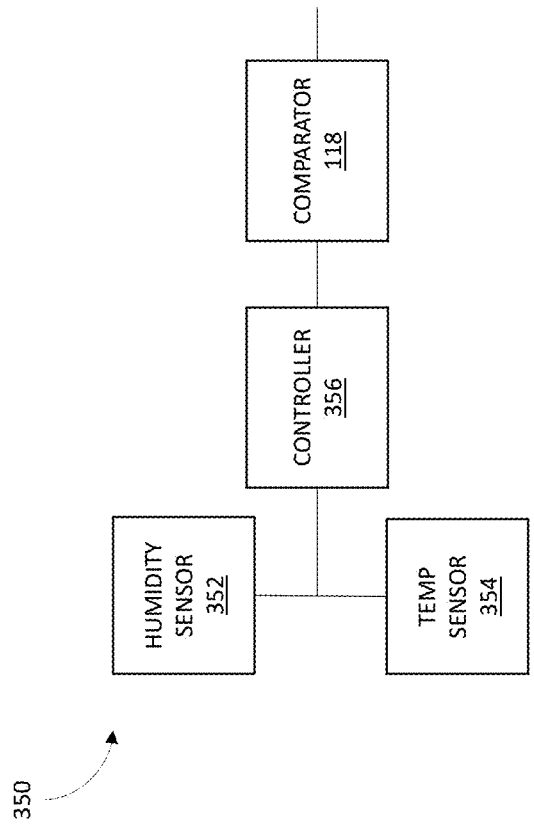
FIG. 3B is a block diagram of an example compensation circuit.
Figure 3A:
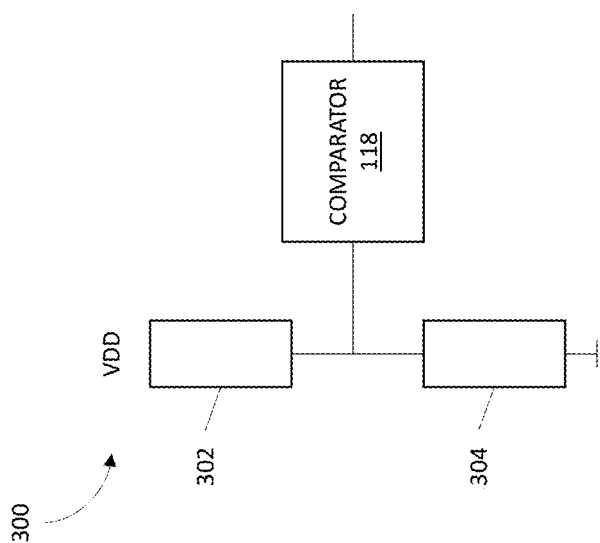
FIG. 3A is a block diagram of an example compensation circuit.

In some examples, the characteristics of the isolation device 108 and other components of the TDD transceiver 100 can vary depending on environmental conditions. For some applications, the accuracy of measurements and alarm determinations needs to be maintained over large variations in temperature and humidity. Therefore, in some examples, the threshold values(s) used by the comparator 118 are compensated based on variation in temperature and humidity. FIGS. 3A-3B depict example circuits 300, 350, which are configured to compensate the threshold value(s) for the comparator 118.

In the example shown in FIG. 3A, the compensation circuit 300 is passive and includes a voltage divider to compensate the threshold value(s). In the example shown in FIG. 3A, the compensation circuit 300 includes a resistor 302 and a thermistor 304. In some examples, the thermistor 304 is a negative temperature coefficient thermistor. In other examples, the thermistor 304 is a positive temperature coefficient thermistor. The threshold value(s) used by the comparator 118 are modified based on the output signal from the compensation circuit 300.

In the example shown in FIG. 3B, the compensation circuit 350 is active and includes a controller to compensate the threshold value(s). In the example shown in FIG. 3B, the compensation circuit 350 includes a humidity sensor 352 and a temperature sensor 354 coupled to a controller 356. In some examples, the controller 356 is a PIC microcontroller. The controller 356 is configured to receive humidity and temperature measurements from the humidity sensor 352 and temperature sensor 254, respectively, and adjust the threshold value(s) for the comparator 118 based on the humidity and temperature measurements.

Compared to the common return loss measurement systems, the receiver protection circuit 113 described herein provides significant improvements in shutdown and alarming time. For example, one implementation of the receiver protection circuit 113 was shown to output an alarm signal and shut down the driver stage in the range of 100 ns. Further, the receiver protection circuit 113 described herein delivers better accuracy for determining low return losses and does not degrade the maximum transmit output power by locating the directional coupler in the receive signal path rather than at the antenna. Moreover, the receiver protection circuit 113 does not require a processing unit, so the receiver protection circuit 113 can be implemented at a lower cost than common return measurement systems.

The receiver protection circuit 113 described above can be used in conjunction with a number of RF circuits and system architectures such as, but not limited to: wireless network access points, distributed antenna systems, RF repeaters, cellular communications base stations, and small cell base stations.

Figure 4:
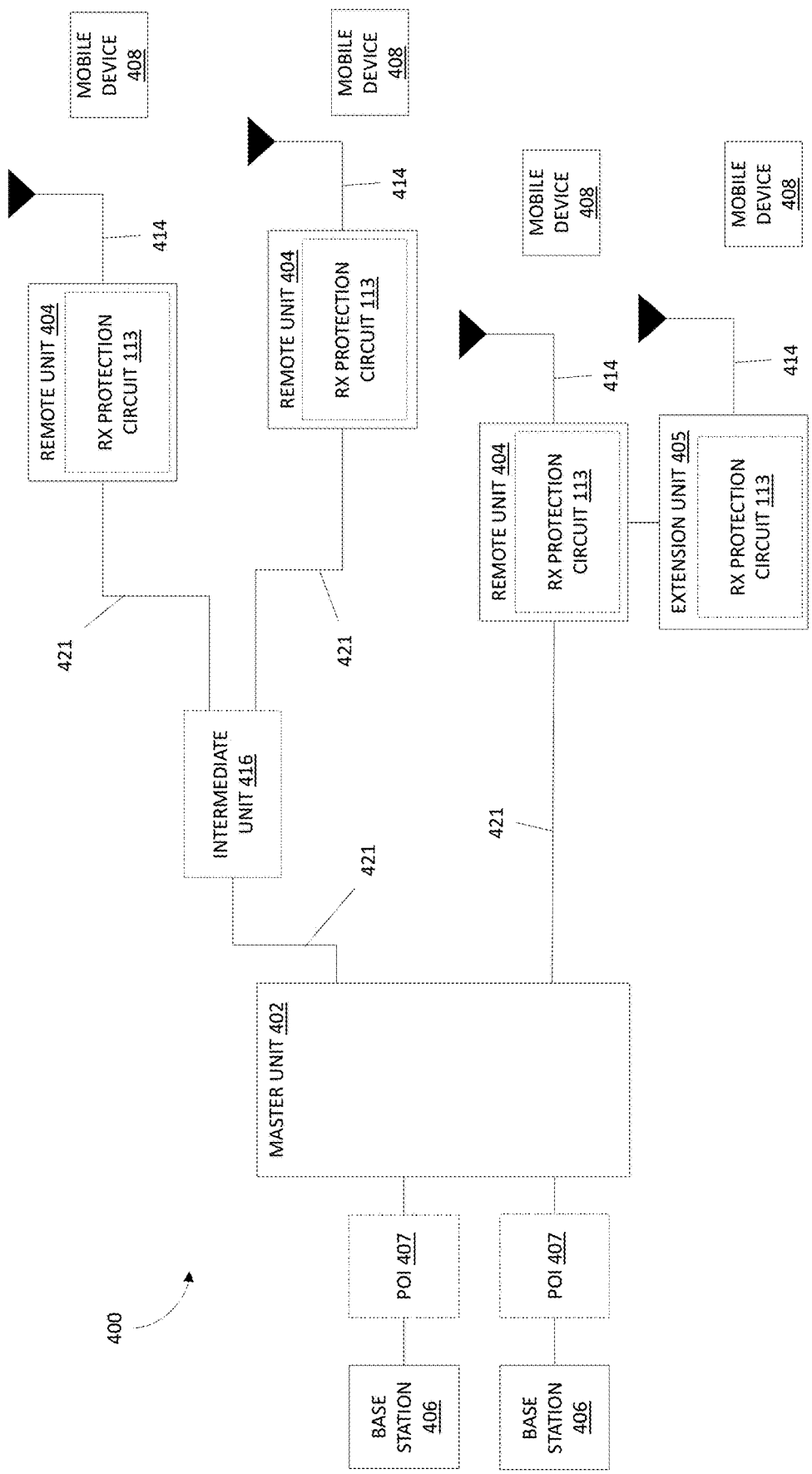
FIG. 4 is a block diagram illustrating an example distributed antenna system utilizing a receiver protection circuit.

FIG. 4 is a block diagram of an example distributed antenna system (DAS) 400 that includes the receiver protection circuit 113 in one or more components of the DAS 400. In the example of FIG. 4, the DAS 400 includes one or more master units 402 (also referred to as "host units" or "central area nodes" or "central units") and one or more remote antenna units 404 (also referred to as "remote units" or "radiating points") that are communicatively coupled to the one or more master units 402. In this example, the DAS 400 comprises a digital DAS, in which DAS traffic is distributed between the master units 402 and the remote antenna units 404 in digital form. The DAS 400 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 402 is communicatively coupled to the plurality of base stations 406. One or more of the base stations 406 can be co-located with the respective master unit 402 to which it is coupled (for example, where the base station 406 is dedicated to providing base station capacity to the DAS 400). Also, one or more of the base stations 406 can be located remotely from the respective master unit 402 to which it is coupled (for example, where the base station 406 is a macro base station providing base station capacity to a macro cell in addition to providing capacity to the DAS 400). In this latter case, a master unit 402 can be coupled to a donor antenna using an over-the-air repeater in order to wirelessly communicate with the remotely located base station.

The base stations 406 can be implemented in a traditional manner in which a base band unit (BBU) is deployed at the same location with a remote radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (O-RAN) families of specifications). Also, the base stations 406 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 406 can be implemented as a small cell base station in which the BBU and RRH functions are deployed together in a single package.

The master unit 402 can be configured to use wideband interfaces or narrowband interfaces to the base stations 406. Also, the master unit 402 can be configured to interface with the base stations 406 using analog radio frequency (RF) interfaces or digital interfaces (for example, using a CPRI, OBSAI, or O-RAN digital interface). In some examples, the master unit 402 interfaces with the base stations 406 via one or more wireless interface nodes (not shown). A wireless interface node can be located, for example, at a base station hotel, and group a particular part of a RF installation to transfer to the master unit 402.

Traditionally, a master unit 402 interfaces with one or more base stations 406 using the analog radio frequency signals that each base station 406 communicates to and from a mobile device 408 (also referred to as "mobile units" or "user equipment") of a user using a suitable air interface standard. Although the devices 408 are referred to here as "mobile" devices 408, it is to be understood that the devices 408 need not be mobile in ordinary use (for example, where the device 408 is integrated into, or is coupled to, a sensor unit that is deployed in a fixed location and that periodically wirelessly communicates with a gateway or other device). The DAS 400 operates as a distributed repeater for such radio frequency signals. RF signals transmitted from each base station 406 (also referred to herein as "downlink RF signals") are received at the master unit. In such examples, the master unit 402 uses the downlink RF signals to generate a downlink transport signal that is distributed to one or more of the remote antenna units 404. Each such remote antenna unit 404 receives the downlink transport signal and reconstructs a version of the downlink RF signals based on the downlink transport signal and causes the reconstructed downlink RF signals to be radiated from an antenna 414 coupled to or included in that remote antenna unit 404.

In some aspects, the master unit 402 is directly coupled to the remote antenna units 404. In such aspects, the master unit 402 is coupled to the remote antenna units 404 using cables 421. For example, the cables 421 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 408 (also referred to herein as "uplink RF signals") are received at one or more remote antenna units 404 via an antenna 414. Each remote antenna unit 404 uses the uplink RF signals to generate an uplink transport signal that is transmitted from the remote antenna unit 404 to a master unit 402. The master unit 402 receives uplink transport signals transmitted from one or more remote antenna units 404 coupled to it. The master unit 402 can combine data or signals communicated via the uplink transport signals from multiple remote antenna units 404 (for example, where the DAS 400 is implemented as a digital DAS 400, by digitally summing corresponding digital samples received from the various remote antenna units 404) and generates uplink RF signals from the combined data or signals. In such examples, the master unit 402 communicates the generated uplink RF signals to one or more base stations 406. In this way, the coverage of the base stations 406 can be expanded using the DAS 400.

As noted above, in the example shown in FIG. 4, the DAS 400 is implemented as a digital DAS. In some examples of a "digital" DAS, real digital signals are communicated between the master unit 402 and the remote antenna units 404. In some examples of a "digital" DAS, signals received from and provided to the base stations 406 and mobile devices 408 are used to produce digital in-phase (I) and quadrature (Q) samples, which are communicated between the master unit 402 and remote antenna units 404. It is important to note that this digital IQ representation of the original signals received from the base stations 406 and from the mobile units still maintains the original modulation (that is, the change in the instantaneous amplitude, phase, or frequency of a carrier) used to convey telephony or data information pursuant to the cellular air interface standard used for wirelessly communicating between the base stations 406 and the mobile units. Examples of such cellular air interface standards include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface standards. Also, each stream of digital IQ samples represents or includes a portion of the frequency spectrum. For example, the digital IQ samples can represent a single radio access network carrier (for example, a 5G NR carrier with 40 MHz or 400 MHz signal bandwidth) onto which voice or data information has been modulated using a 5G NR air interface. However, it is to be understood that each such stream can also represent multiple carriers (for example, in a band of the frequency spectrum or a sub-band of a given band of the frequency spectrum).

In the example shown in FIG. 4, the master unit 402 can be configured to interface with one or more base stations 406 using an analog RF interface (for example, via the analog RF interface of an RRH or a small cell base station). In some examples, the base stations 406 can be coupled to the master unit 402 using a network of attenuators, combiners, splitters, amplifiers, filters, cross-connects, etc., which is referred to collectively as a point-of-interface (POI) 407. This is done so that, in the downlink, the desired set of RF carriers output by the base stations 406 can be extracted, combined, and routed to the appropriate master unit 402, and so that, in the uplink, the desired set of carriers output by the master unit 402 can be extracted, combined, and routed to the appropriate interface of each base station 406. In other examples, the POI 407 can be part of the master unit 402.

In the example shown in FIG. 4, in the downlink, the master unit 402 can produce digital IQ samples from an analog signal received at certain radio frequencies. These digital IQ samples can also be filtered, amplified, attenuated, and/or re-sampled or decimated to a lower sample rate. The digital samples can be produced in other ways. Each stream of digital IQ samples represents a portion of the frequency spectrum output by one or more base stations 406.

Likewise, in the uplink, the master unit 402 can produce an uplink analog signal from one or more streams of digital IQ samples received from one or more remote antenna units 404 by digitally combining streams of digital IQ samples that represent the same carriers or frequency bands or sub-bands received from multiple remote antenna units 404 (for example, by digitally summing corresponding digital IQ samples from the various remote antenna units 404), performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined.

In the example shown in FIG. 4, the master unit 402 can be configured to interface with one or more base stations 406 using a digital interface (in addition to, or instead of) interfacing with one or more base stations 406 via an analog RF interface. For example, the master unit 402 can be configured to interact directly with one or more BBUs using the digital IQ interface that is used for communicating between the BBUs and an RRHs (for example, using the CPRI serial digital IQ interface).

In the downlink, the master unit 402 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 404 used in the DAS 400. In the uplink, the master unit 402 receives uplink streams of digital IQ samples from one or more remote antenna units 404, digitally combining streams of digital IQ samples that represent the same carriers or frequency bands or sub-bands received from multiple remote antenna units 404 (for example, by digitally summing corresponding digital IQ samples received from the various remote antenna units 404), and, if necessary, converts (by re-sampling, synchronizing, combining, separating, gain adjusting, etc.) them into uplink streams of digital IQ samples compatible with the one or more BBUs that are coupled to that master unit 402.

In the downlink, each remote antenna unit 404 receives streams of digital IQ samples from the master unit 402, where each stream of digital IQ samples represents a portion of the radio frequency spectrum output by one or more base stations 406. Each remote antenna unit 404 generates, from the downlink digital IQ samples, one or more downlink RF signals for radiation from the one or more antennas coupled to that remote antenna unit 404 for reception by any mobile devices 408 in the associated coverage area. In the uplink, each remote antenna unit 404 receives one or more uplink radio frequency signals transmitted from any mobile devices 408 in the associated coverage area, generates one or more uplink streams of digital IQ samples derived from the received one or more uplink radio frequency signals, and transmits them to the master unit 402.

Each remote antenna unit 404 can be communicatively coupled directly to one or more master units 402 or indirectly via one or more other remote antenna units 404 and/or via one or more intermediate units 416 (also referred to as "expansion units" or "transport expansion nodes"). The latter approach can be done, for example, in order to increase the number of remote antenna units 404 that a single master unit 402 can feed, to increase the master-unit-to-remote-antenna-unit distance, and/or to reduce the amount of cabling needed to couple a master unit 402 to its associated remote antenna units 404. The expansion units are coupled to the master unit 402 via one or more cables 421.

In the example DAS 400 shown in FIG. 4, a remote antenna unit 404 is shown having another co-located remote antenna unit 405 (also referred to herein as an "extension unit") communicatively coupled to it. Subtending a co-located extension remote antenna unit 405 from another remote antenna unit 404 can be done in order to expand the number of frequency bands that are radiated from that same location and/or to support MIMO service (for example, where different co-located remote antenna units radiate and receive different MIMO streams for a single MIMO frequency band). The remote antenna unit 404 is communicatively coupled to the "extension" remote antenna units 405 using a fiber optic cable, a multi-conductor cable, coaxial cable, or the like. In such an implementation, the remote antenna units 405 are coupled to the master unit 402 of the DAS 400 via the remote antenna unit 404.

In some examples, one or more components of the DAS 400 include the receiver protection circuit 113 as described above. For example, the remote antenna units 404, 405 can include the receiver protection circuit 113 in order to prevent damage to the receiver circuitry in the remote antenna units 404, 405. In some examples, the receiver protection circuit 113 is coupled to the uplink path in one or more remote antenna units 404, 405.

Figure 5:
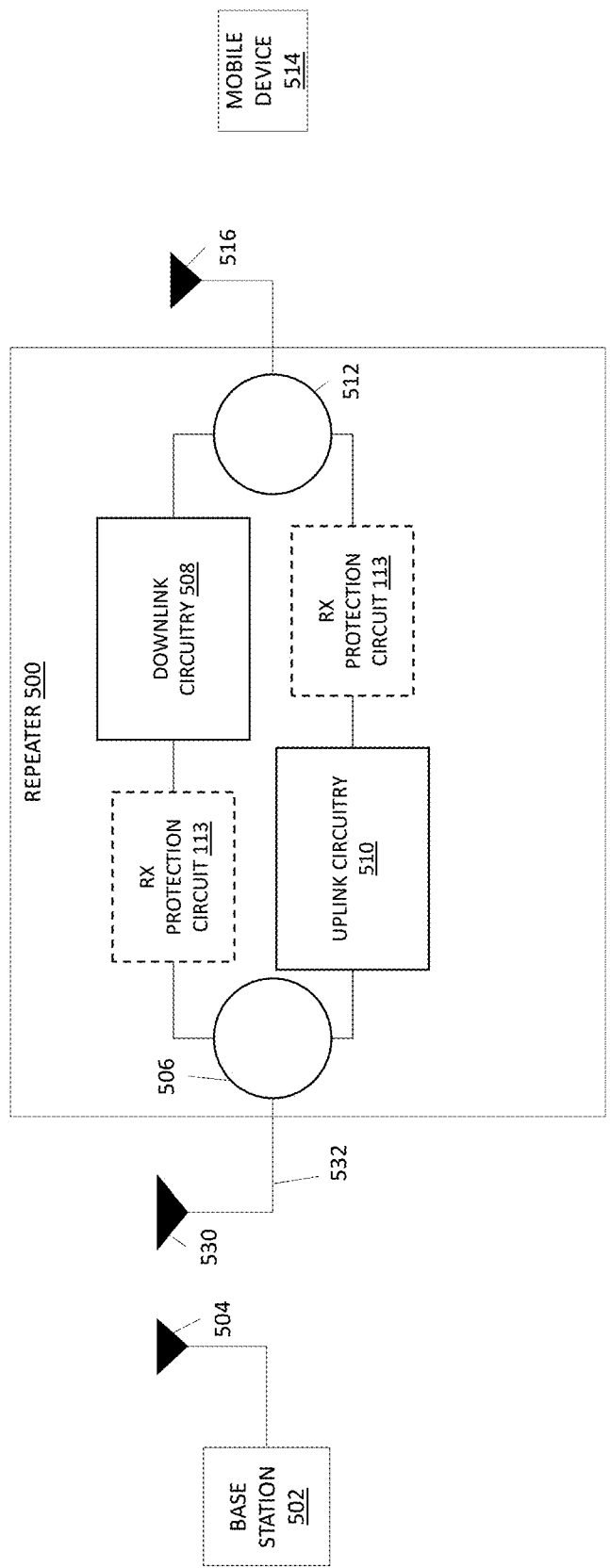
FIG. 5 is a block diagram illustrating an example repeater system utilizing a receiver protection circuit.

Other types of radio frequency distribution systems can also benefit from the receiver protection circuit 113 described above. FIG. 5 illustrates an example of a single-node repeater 500 that includes one or more receiver protection circuits 113 as discussed above.

In the exemplary embodiment shown in FIG. 5, the single-node repeater 500 is coupled to one or more base stations 502 using a donor antenna 530.

The single-node repeater 500 includes a first isolation device 506 having a common port that is coupled to the donor antenna 530 via a cable 532, a downlink port that is coupled to the downlink circuitry 508, and an uplink port that is coupled to the uplink circuitry 510.

In general, the single-node repeater 500 is configured to receive one or more downlink signals from one or more base stations 502. Each base station downlink signal includes one or more radio frequency channels used for communicating in the downlink direction with user equipment 514 over the relevant one or more wireless air interfaces. The downlink circuitry 508 is configured to amplify the downlink signals received at the repeater 500 and re-radiate the amplified downlink signals via the coverage antenna 516. As a part of doing this, the downlink circuitry 508 can be configured to filter the downlink signals to separate out the individual channels, individually amplify each filtered downlink channel signal, combine the individually amplified downlink channel signals, and re-radiate the resulting combined signal.

Similar processing is performed in the uplink. The single-node repeater 500 is configured to receive one or more uplink signals from mobile device 514. Each mobile device uplink signal includes one or more radio frequency channels used for communicating in the uplink direction with one or more base stations 502 over the relevant one or more wireless air interfaces. The uplink circuitry 510 is configured to amplify the uplink signals received at the repeater 500 and re-radiate the amplified uplink signals via the donor antenna 530. As a part of doing this, the uplink circuitry 510 can be configured to filter the uplink signals to separate out the individual channels, individually amplify each filtered uplink channel signal, combine the individually amplified uplink channel signals, and re-radiate the resulting combined signal.

The single-node repeater 500 can be configured to implement one or more features to provide sufficient isolation between the donor antenna 530 and the coverage antenna 516. These features can include gain control circuitry and adaptive cancellation circuitry. Other features can be implemented. These features can be implemented in one or more of the downlink circuitry 508 and/or the uplink circuitry 510. These features can also be implemented in separate circuitry.

In some examples, the single-node repeater 500 can include at least one receiver protection circuit 113 as described above in order to protect receiver circuitry from damage. For example, the single-node repeater 500 can include a receiver protection circuit 113 coupled to the uplink path between the donor antenna 530 and the uplink circuitry 510 and/or a receiver protection circuit 113 coupled to the downlink path between the downlink circuitry 508 and the coverage antenna 516.

The various circuitry and features of the single-node repeater 500 can be implemented in analog circuitry, digital circuitry, or combinations of analog circuitry and digital circuitry. The downlink circuitry 508 and uplink circuitry 510 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink circuitry 508 and uplink circuitry 510 may share common circuitry and/or components.

Figure 6:
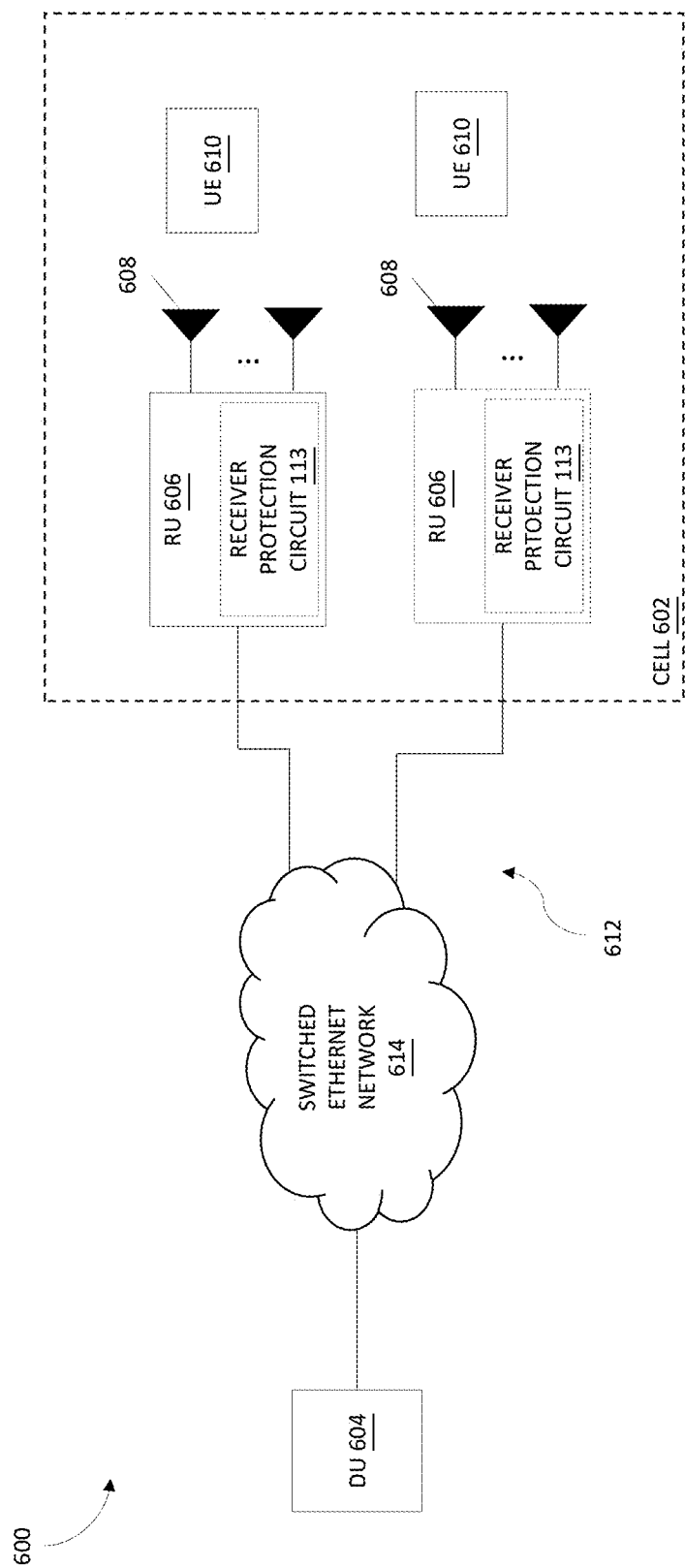
FIG. 6 is a block diagram illustrating an example radio access network utilizing a receiver protection circuit.

Another example of a telecommunication system in which the receiver protection circuit 113 described above can be used is shown in FIG. 6. FIG. 6 is a block diagram illustrating one exemplary embodiment of a radio access network (RAN) system 600 in which the receiver protection circuit 113 described above can be used. The RAN system 600 shown in FIG. 6 implements a base station. The RAN system 600 can also be referred to here as a "base station" or "base station system."

In the example shown in FIG. 6, the system 600 is implemented at least in part using a centralized or cloud RAN (C-RAN) architecture that employs, for each cell (or sector) 601 served by the system 600, at least one distributed unit (DU) 604 and one or more remote units (RUs) 606. The system 600 is also referred to here as a "C-RAN system"

600. The one or more RUs 606 are remotely located from each DU 604 serving it. Also, in some examples, at least one of the RUs 606 is remotely located from at least one other RU 606 serving that cell 602. It should be understood that the C-RAN implementation of the RAN system 600 is only one way of implementing the RAN system 600 and the architecture of the RAN system 600 can be implemented in other ways.

The RAN system 600 can be implemented in accordance with one or more public standards and specifications. For example, the RAN system 600 can be implemented using a RAN architecture and/or RAN fronthaul interfaces defined by the O-RAN Alliance. In such an O-RAN example, the DU 604 and one or more RUs 606 can be implemented as O-RAN distributed units (DUs) and one or more O-RAN remote units (RUs), respectively, in accordance with the O-RAN specifications. More specifically, the DU 604 and the one or more RUs 606 are configured to use the O-RAN fronthaul specification. While multiple RUs 606 are shown in FIG. 6, it should be understood that the RAN system 600 can be implemented with one DU 604 and one RU 606, which is more common for O-RAN implementations.

The one or more RUs 606 include or are coupled to one or more antennas 608 via which downlink RF signals are radiated to various items of user equipment (UE) 610 and via which uplink RF signals transmitted by UEs 610 are received.

In some examples, the system 600 is coupled to a core network of the associated wireless network operator over an appropriate backhaul (such as the Internet). Also, each DU 604 is communicatively coupled to the one or more RUs 606 served by it using a fronthaul 612. Each of the DU 604 and the one or more RUs 606 include one or more network interfaces (not shown) in order to enable the DU 604 and the one or more RUs 606 to communicate over the fronthaul 612.

In one implementation, the fronthaul 612 that communicatively couples the DU 604 to the one or more RUs 606 is implemented using a switched ETHERNET network 614. In such an implementation, each DU 604 and one or more RUs 606 includes one or more ETHERNET interfaces for communicating over the switched ETHERNET network 614 used for the fronthaul 612. However, it is to be understood that the fronthaul between each DU 604 and the one or more RUs 606 served by it can be implemented in other ways.

Generally, for each cell 602 implemented by the RAN system 600, each DU 604 serving the cell 602 performs the LAYER-3 and LAYER-2 functions for the particular wireless interface used for that cell 602. Also, for each cell 602 implemented by the RAN system 600, each corresponding DU 604 serving the cell 602 performs some of the LAYER-1 functions for the particular wireless interface used for that cell 602. Each of the one or more RUs 606 serving that cell 602 perform the LAYER-1 functions not performed by the DU 604 as well as implementing the basic RF and antenna functions.

Each DU 604 and RU 606 (and the functionality described as being included therein), as well as the system 600 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each DU 604, RU 606, and the system 600 more generally, can be implemented in other ways.

In some examples, one or more components of the RAN system 600 include the receiver protection circuit 113 as described above. For example, one or more RUs 606 can include the receiver protection circuit 113 in order to protect receiver circuitry from damage. In some examples, a receiver protection circuit 113 is coupled to the uplink path in one or more RUs 606.

In various aspects, system elements, method steps, or examples described throughout this disclosure (such as the TDD transceiver, DAS, single-node repeater, RAN system, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media, which are provided by communication networks, wired, and/or wireless.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a communications device, comprising: a transmit signal path; a receive signal path; an isolation device coupled to the transmit signal path and the receive signal path, wherein the isolation device is configured to provide an analog transmit signal from the transmit signal path to an antenna port of the isolation device, wherein the isolation device is configured to provide an analog receive signal from the antenna port to the receive signal path; a coupler coupled to the receive signal path between the isolation device and an amplifier of the receive signal path; a power detector coupled to the coupler and configured to measure a power level of a transmit leakage signal in the receive signal path; a comparator configured to compare the measured power level of the transmit leakage signal to a first threshold value and output a first alarm signal indicating that the measured power level of the transmit leakage signal exceeds the first threshold value; and wherein the communications device is configured to reduce a transmit output power in response to the first alarm signal.

Example 2 includes the communications device of Example 1, wherein the communications device is configured to reduce the transmit output power by: turning off a driver stage in the transmit signal path; reducing a supply voltage of the driver stage in the transmit signal path; reducing a supply voltage of a power amplifier in the transmit signal path; attenuating a signal traversing the transmit signal path; and/or switching off a bias signal for a power amplifier in the transmit signal path.

Example 3 includes the communications device of any of Examples 1-2, further comprising: a resistor and a thermistor that form a passive compensation circuit; wherein the communications device is configured to adjust the first threshold value based on an output of the passive compensation circuit.

Example 4 includes the communications device of any of Examples 1-2, further comprising: a temperature sensor; a humidity sensor; and a controller configured to adjust the first threshold value based on a temperature measurement from the temperature sensor and a humidity measurement from the humidity sensor.

Example 5 includes the communications device of any of Examples 1-4, further comprising a switch in the receive signal path, wherein the switch is positioned between the coupler and the amplifier, wherein the switch is configured to provide the analog receive signal to the amplifier in a first state, wherein the switch is coupled to a termination in a second state; wherein the communications device is configured to control the switch to be in the first state or the second state based on a time-division duplexing schedule.

Example 6 includes the communications device of Example 5, wherein the communications device is configured to control the switch to be in the second state in response to the first alarm signal.

Example 7 includes the communications device of any of Examples 1-6, wherein the first threshold value is determined based on a known relationship between return loss at the antenna port and isolation between the transmit signal path and the receive signal path.

Example 8 includes the communications device of any of Examples 1-7, wherein the isolation device is a circulator.

Example 9 includes the communications device of any of Examples 1-8, wherein the power detector is a peak power detector.

Example 10 includes the communications device of any of Examples 1-9, wherein the communications device is one of: a remote unit of a distributed antenna system; a radio frequency repeater; a radio point for a small cell; an access point; or a remote radio head of a base station.

Example 11 includes the communications device of any of Examples 1-10, wherein the comparator is configured to compare the measured power level of the transmit leakage signal to a second threshold value that is different than the first threshold value and output a second alarm signal indicating that the measured power level of the transmit leakage signal exceeds the second threshold value; wherein the communications device is configured to reduce the transmit output power in response to the second alarm signal.

Example 12 includes a method of protecting receiver circuitry, comprising: measuring a power level of a transmit leakage signal in a receive signal path; comparing the measured power level of the transmit leakage signal to a threshold voltage; outputting an alarm signal indicating that the measured power level of the transmit leakage signal exceeds the threshold voltage; and reducing a transmit output power in response to the alarm signal.

Example 13 includes the method of Example 12, wherein reducing the transmit output power includes: turning off a driver stage in a transmit signal path; reducing a supply voltage of the driver stage in the transmit signal path; reducing a supply voltage of a power amplifier in the transmit signal path; attenuating a signal traversing the transmit signal path; and/or switching off a bias signal for a power amplifier in the transmit signal path.

Example 14 includes the method of any of Examples 12-13, further comprising controlling a switch in the receive signal path to be in a first state or a second state based on a time-division duplexing schedule, wherein the switch is configured to provide an analog receive signal to an amplifier of the receive signal path in the first state, wherein the switch is coupled to a termination in the second state.

Example 15 includes the method of Example 14, further comprising controlling the switch to be in the second state in response to the alarm signal.

Example 16 includes a receiver protection circuit, comprising: a directional coupler configured to be coupled to a receive signal path of a communications device between an isolation device and an amplifier of the receive signal path; a power detector coupled to the directional coupler and configured to measure a power level of a transmit leakage signal in the receive signal path; and a comparator configured to compare the measured power level of the transmit leakage signal in the receive signal path to a first threshold value and output a first alarm signal indicating that the measured power level of the transmit leakage signal exceeds the first threshold value.

Example 17 includes the receiver protection circuit of Example 16, further comprising: a resistor and a thermistor that form a passive compensation circuit; wherein the first threshold value used by the comparator is configured to be adjusted based on an output of the passive compensation circuit.

Example 18 includes the receiver protection circuit of Example 16, further comprising: a temperature sensor; a humidity sensor; and a microcontroller configured to adjust the first threshold value based on a temperature measurement from the temperature sensor and a humidity measurement from the humidity sensor.

Example 19 includes the receiver protection circuit of any of Examples 16-18, wherein the power detector is a peak power detector.

Example 20 includes the receiver protection circuit of any of Examples 16-19, wherein the comparator is configured to compare the measured power level of the transmit leakage signal to a second threshold value that is different than the first threshold value and output a second alarm signal indicating that the measured power level of the transmit leakage signal exceeds the second threshold value; wherein the communications device is configured to reduce a transmit output power in response to the second alarm signal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A communications device, comprising:
   a transmit signal path;
   a receive signal path;
   an isolation device coupled to the transmit signal path and the receive signal path, wherein the isolation device is configured to provide an analog transmit signal from the transmit signal path to an antenna port of the isolation device, wherein the isolation device is configured to provide an analog receive signal from the antenna port to the receive signal path;
   a coupler coupled to the receive signal path between the isolation device and an amplifier of the receive signal path;
   a power detector coupled to the coupler and configured to measure a power level of a transmit leakage signal in the receive signal path; and
   a comparator configured to compare the measured power level of the transmit leakage signal to a first threshold value and output a first alarm signal indicating that the measured power level of the transmit leakage signal exceeds the first threshold value;
   wherein the communications device is configured to reduce a transmit output power in response to the first alarm signal.

2. The communications device of claim 1, wherein the communications device is configured to reduce the transmit output power by:
   turning off a driver stage in the transmit signal path;
   reducing a supply voltage of the driver stage in the transmit signal path;
   reducing a supply voltage of a power amplifier in the transmit signal path;
   attenuating a signal traversing the transmit signal path; and/or
   switching off a bias signal for a power amplifier in the transmit signal path.

3. The communications device of claim 1, further comprising:
   a resistor and a thermistor that form a passive compensation circuit;
   wherein the communications device is configured to adjust the first threshold value based on an output of the passive compensation circuit.

4. The communications device of claim 1, further comprising:
   a temperature sensor;
   a humidity sensor; and
   a controller configured to adjust the first threshold value based on a temperature measurement from the temperature sensor and a humidity measurement from the humidity sensor.

5. The communications device of claim 1, further comprising a switch in the receive signal path, wherein the switch is positioned between the coupler and the amplifier, wherein the switch is configured to provide the analog receive signal to the amplifier in a first state, wherein the switch is coupled to a termination in a second state;
   wherein the communications device is configured to control the switch to be in the first state or the second state based on a time-division duplexing schedule.

6. The communications device of claim 5, wherein the communications device is configured to control the switch to be in the second state in response to the first alarm signal.

7. The communications device of claim 1, wherein the first threshold value is determined based on a known relationship between return loss at the antenna port and isolation between the transmit signal path and the receive signal path.

8. The communications device of claim 1, wherein the isolation device is a circulator.

9. The communications device of claim 1, wherein the power detector is a peak power detector.

10. The communications device of claim 1, wherein the communications device is one of:
    a remote unit of a distributed antenna system;
    a radio frequency repeater;
    a radio point for a small cell;
    an access point; or
    a remote radio head of a base station.

11. The communications device of claim 1, wherein the comparator is configured to compare the measured power level of the transmit leakage signal to a second threshold value that is different than the first threshold value and output a second alarm signal indicating that the measured power level of the transmit leakage signal exceeds the second threshold value;
    wherein the communications device is configured to reduce the transmit output power in response to the second alarm signal.

12. A method of protecting receiver circuitry, comprising:
    measuring a power level of a transmit leakage signal in a receive signal path;
    comparing the measured power level of the transmit leakage signal to a threshold voltage;
    outputting an alarm signal indicating that the measured power level of the transmit leakage signal exceeds the threshold voltage; and
    reducing a transmit output power in response to the alarm signal.

13. The method of claim 12, wherein reducing the transmit output power includes:
    turning off a driver stage in a transmit signal path;
    reducing a supply voltage of the driver stage in the transmit signal path;

reducing a supply voltage of a power amplifier in the transmit signal path;

attenuating a signal traversing the transmit signal path; and/or switching off a bias signal for a power amplifier in the transmit signal path.

14. The method of claim 12, further comprising controlling a switch in the receive signal path to be in a first state or a second state based on a time-division duplexing schedule, wherein the switch is configured to provide an analog receive signal to an amplifier of the receive signal path in the first state, wherein the switch is coupled to a termination in the second state.

15. The method of claim 14, further comprising controlling the switch to be in the second state in response to the alarm signal.

16. A receiver protection circuit, comprising:
a directional coupler configured to be coupled to a receive signal path of a communications device between an isolation device and an amplifier of the receive signal path;
a power detector coupled to the directional coupler and configured to measure a power level of a transmit leakage signal in the receive signal path; and
a comparator configured to compare the measured power level of the transmit leakage signal in the receive signal path to a first threshold value and output a first alarm signal indicating that the measured power level of the transmit leakage signal exceeds the first threshold value.

17. The receiver protection circuit of claim 16, further comprising:
a resistor and a thermistor that form a passive compensation circuit;
wherein the first threshold value used by the comparator is configured to be adjusted based on an output of the passive compensation circuit.

18. The receiver protection circuit of claim 16, further comprising:
a temperature sensor;
a humidity sensor; and
a microcontroller configured to adjust the first threshold value based on a temperature measurement from the temperature sensor and a humidity measurement from the humidity sensor.

19. The receiver protection circuit of claim 16, wherein the power detector is a peak power detector.

20. The receiver protection circuit of claim 16, wherein the comparator is configured to compare the measured power level of the transmit leakage signal to a second threshold value that is different than the first threshold value and output a second alarm signal indicating that the measured power level of the transmit leakage signal exceeds the second threshold value;
wherein the communications device is configured to reduce a transmit output power in response to the second alarm signal.

* * * * *